United States Patent [19]

Watanabe et al.

[11] Patent Number: 5,166,703
[45] Date of Patent: Nov. 24, 1992

[54] PRINTING DEVICE EMPLOYING SEMICONDUCTOR LASER AND SEMICONDUCTOR-LASER-PUMPED SOLID-STATE LASER

[75] Inventors: Mitsuyoshi Watanabe, Aichi; Makoto Suzuki, Nagoya, both of Japan

[73] Assignee: Brother Kogyo Kabushiki Kaisha, Nagoya, Japan

[21] Appl. No.: 666,144

[22] Filed: Mar. 7, 1991

[30] Foreign Application Priority Data

Mar. 8, 1990 [JP] Japan .................................. 2-57562

[51] Int. Cl.⁵ .............................................. H04N 1/21
[52] U.S. Cl. ...................................... 346/108; 372/21; 372/71; 372/75; 372/69
[58] Field of Search .................... 346/108, 107 R, 160; 372/21, 22, 23, 24, 25, 69, 70, 71, 72, 73, 74, 75

[56] References Cited

U.S. PATENT DOCUMENTS 4,791,631 12/1988 Baumert et al. ..................... 372/22
4,860,302 8/1989 Janes ..................................... 372/70
4,897,562 1/1990 Krasinski et al. ..................... 372/21

Primary Examiner—Mark J. Reinhart
Attorney, Agent, or Firm—Oliff & Berridge

[57] ABSTRACT

A printing device employs a semiconductor laser source for producing a laser beam, and a semiconductor-laser-pumped solid-state laser. The solid-state laser includes an optical resonator, such as a nonlinear optical element for effecting wavelength conversion, and a solid-state laser material disposed therein. The solid-state laser material is optically pumped by the laser beam from the semiconductor laser source and produces a laser beam to be applied onto a photosensitive sheet of paper. Responsive to print data, the intensity of the laser beam from the semiconductor laser source is varied between a first intensity level and a second intensity level. The photosensitive sheet of paper is insensitive to the laser beam when the laser beam from the semiconductor laser source is at the first intensity level, whereas it is sensitive to the laser beam when the laser beam from the semiconductor laser source is at the second intensity level.

15 Claims, 2 Drawing Sheets

PRINTING DEVICE EMPLOYING SEMICONDUCTOR LASER AND SEMICONDUCTOR-LASER-PUMPED SOLID-STATE LASER

BACKGROUND OF THE INVENTION

The present invention relates to a printing device for exposing a photosensitive sheet of paper with a combination of a semiconductor laser and a semiconductor-laser-pumped solid-state laser, and a color printer which incorporates the printing device There have been proposed various color printers. One color printer is of the intermediate image production system wherein intermediate images of R (red), G (green), and B (blue) colors are produced, and a photosensitive sheet of paper is exposed three times to the lights bearing these three-color images. Another color printer system includes a dichroic mirror for combining laser beams emitted from respective R, G, B laser beam sources into a single laser beam which is deflected by a deflecting optical system to scan a photosensitive sheet of paper wound on a drum. According to the latter system, the laser beam sources used are gas lasers of a red semiconductor laser, green and blue lasers which are composed of a combination of a wavelength converter and a semiconductor-laser-pumped solid-state laser.

The intermediate image production system has its resolution limited by the accuracy with which the three-color images are registered and also by the device which produces the intermediate images. The laser beam sources used in the system in which the photosensitive sheet of paper is exposed to the laser beams in three colors, should preferably be a semiconductor laser and a semiconductor-laser-pumped solid-state laser from the standpoints of reliability, service life, and cost. Since the modulation speed of the semiconductor-laser-pumped solid-state laser is limited by the fluorescent lifetime of the solid-state laser, however, the modulation speed required by a printer cannot be obtained simply by directly modulating the semiconductor laser.

Therefore, the printer requires a modulation device, but the modulation device is complex in structure and expensive. The modulation device also makes it difficult to render the printer compact.

SUMMARY OF THE INVENTION

The present invention has been made to solve the above problems. It is accordingly an object of the present invention to provide a printing device which requires no modulation device and is inexpensive and compact.

It is another object of the present invention to provide a color printer which incorporates such a printing device.

To achieve the above and other objects, a printing device according to the present invention has control means for normally controlling the output of a semiconductor laser such that the output of the laser beam from a solid-state laser is of such an intensity not to expose a photosensitive sheet of paper, and for increasing the output of the semiconductor laser or adding a laser beam from another semiconductor laser upon printing, thereby to increase the output of pumping light applied to the solid-state laser for increasing the output of the solid-state laser sufficiently to expose the photosensitive sheet of paper. A nonlinear optical element for effecting wavelength conversion may be disposed in an optical resonator to generate harmonics.

A color printer according to the present invention has a semiconductor laser for emitting a red laser beam, a printing device as described above wherein the solid-state laser emits a green laser beam, and a printing device as described above wherein the solid-state laser emits a blue laser beam.

In the above color printer, a blue laser beam may be produced by a combination of a semiconductor-laser-pumped solid-state laser and a nonlinear optical element, the blue laser beam having a frequency which is the sum of the frequencies of laser beams emitted respectively by the semiconductor-laser-pumped solid-state laser and the nonlinear optical element.

In the printing device according to the present invention, the output of the semiconductor laser is normally controlled by the control means such that the output of the laser beam from the solid-state laser is of such an intensity not expose the photosensitive sheet of paper, and the output of the semiconductor laser is increased or the laser beam from the other semiconductor laser is added upon printing, thereby to increase the output of pumping light applied to the solid-state laser for increasing the output of the solid-state laser sufficiently to expose the photosensitive sheet of paper. The nonlinear optical element for effecting wavelength conversion is disposed in the optical resonator. In the color printer according to the present invention, the red laser beam is emitted from the semiconductor laser, and the green and blue laser beams are emitted from the solid-state lasers in the printing devices.

The blue laser beam is produced by the combination of a semiconductor-laser-pumped solid-state laser and a nonlinear optical element, the blue laser beam having a frequency which is the sum of the frequencies of laser beams emitted respectively by the semiconductor-laser-pumped solid-state laser and the nonlinear optical element.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENTS

An embodiment exemplifying the present invention will hereinafter be described with reference to the drawings.

Figure 1:
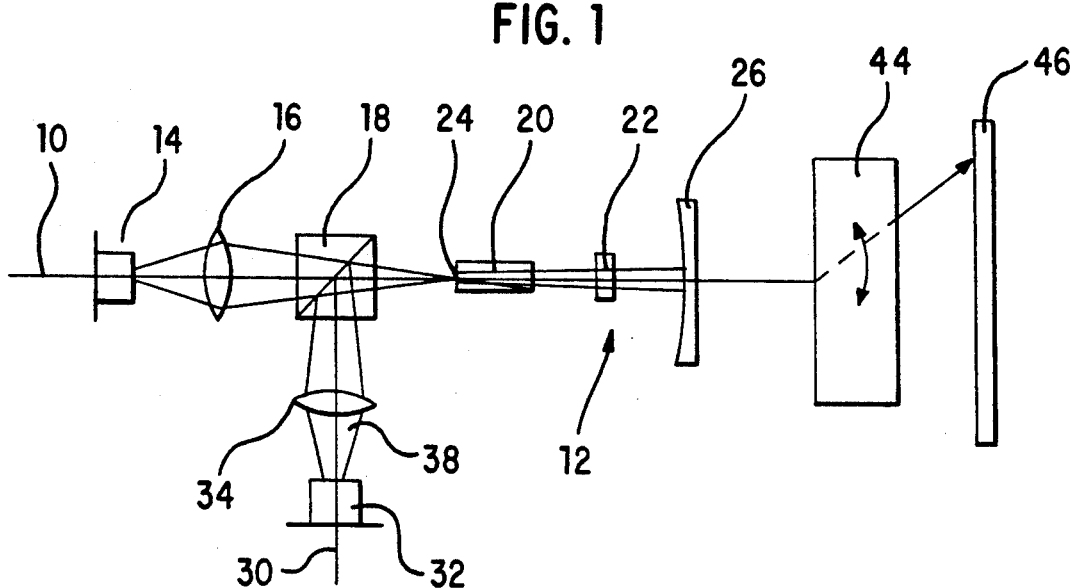
FIG. 1 is a view showing an arrangement of a green laser.

A semiconductor-laser-pumped solid-state laser employed in the embodiment will first be described with reference to FIG. 1. The description will be directed to a green laser in the embodiment.

The green laser according to the embodiment comprises an optical resonator 12, a bias-pumping semiconductor laser 14, a condensing lens system 16, a polarizing beam splitter (hereinafter referred to as a "PBS") 18, an Nd:YAG rod 20, KTP 22, which are all disposed on an optical axis 10, a pulse-output-generating semiconductor laser 32 and a condensing lens system 34 which are disposed on an optical axis 30 that perpendicularly crosses the optical axis 10 in the PBS 18. The optical resonator 12 is composed of an end face 24 of the Nd:YAG rod 20 and an output mirror 26. The end face 24 is covered with a coating which passes a pumping laser beam from the semiconductor laser 14 and reflects a fundamental wave (whose wavelength is 1064 nm) from the Nd:YAG laser. The output mirror 26 is covered with a coating which reflects a fundamental wave from the Nd:YAG laser and passes a second harmonic wave (whose wavelength is 532 nm) from the Nd:YAG laser.

The KTP 22 is a wavelength converter made of KTiOPO4 for converting the fundamental wave of the Nd:YAG laser into the second harmonic wave. The opposite end faces of the KTP 22 are covered with a coating which passes the fundamental and second harmonic waves from the Nd: YAG laser.

A process of generating a high-speed modulated output from the green laser, described above, and printing a photosensitive sheet of paper with the modulated output, will be described below with reference to FIGS. 1 and 2. The photosensitive sheet of paper employed in this embodiment is known from Japanese Laid-Open Patent Publication No. 5888739, for example. The photosensitive sheet of paper carries on its surface a mixture of photosetting microcapsules of plural types having different spectral sensitivities and encapsulating colorants or dye precursors. The photosensitive sheet of paper will hereinafter be referred to as "microcapsule sheet". When the microcapsule sheet is exposed to combined three-color lights of R (red), G (green), B (Blue), the photosetting microcapsules are selectively set depending on the intensities of the R, G, B colors in the combined light. Then, the exposed microcapsule sheet is pressed to rupture those microcapsules which have not been set upon exposure, allowing encapsulated dyes to flow out and react with color developers and develop colors. Therefore, a colored image is recorded in a pattern of the ruptured microcapsules.

A pumping laser beam (whose wavelength is 808 nm) emitted from the semiconductor laser 14 is converged by the condensing lens system 16, passes through the PBS 18, and is applied to the Nd: YAG rod 20. It is assumed that the pumping laser has an output intensity PO. If the output intensity PO is higher than a threshold value Pth, then the pumped Nd:YAG rod 20 generates a fundamental wave, producing a filed of light in the optical resonator 12. The fundamental wave in the optical resonator 12 is converted into a second harmonic wave when it passes through the KTP 22, so that the output mirror 26 emits a green laser beam, which passes through a light deflector 44 to scan the microcapsule sheet 46. The microcapsule sheet 46 has such sensitivity characteristics that there can be defined a power intensity (minimum exposure output intensity) PL below which the microcapsule sheet 46 is not sensitive to the applied laser beam and a power intensity (required exposure output intensity) PH which is required to make the microcapsule sheet 46 sensitive to the applied laser beam. The output intensity Pl of the green laser beam depends on the output intensity PO. Therefore, the output intensity Pl can be made lower than the minimum exposure output intensity PL by setting the output intensity PO to a suitable value. Stated otherwise, even when the Nd: YAG rod 20 is pumped (bias-pumped) by the pumping laser beam with the output intensity PO, since the output intensity Pl of the green laser beam can be low enough not to make the microcapsule sheet 46 sensitive to the applied laser beam. In addition to the pumping laser beam having the output intensity PO from the semiconductor laser 14, a pumping laser beam is also generated by the semiconductor laser 32. Therefore, the sum of the two pumping laser beams is applied to the Nd:YAG rod 20, the sum of the pumping laser beams having an output intensity Pin. The output intensity of the pumping laser 32 is selected such that the output intensity Pout of the green laser beam when the sum of the pumping laser beams has the output intensity Pin is higher than the required exposure output intensity PH, making the microcapsule sheet 46 sensitive to the applied laser beam.

Figure 2A:
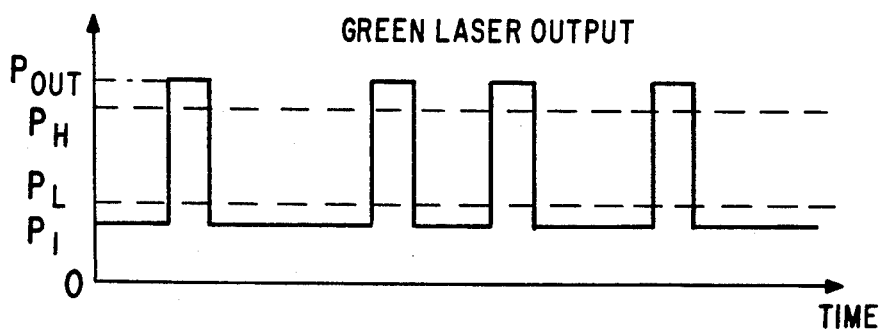
FIGS. 2A and 2B are a set of graphs showing the manner in which the output intensity of an Nd: YAG laser varies when it is bias-pumped by a semiconductor laser and a modulated pumping laser beam is added.
Figure 2B:
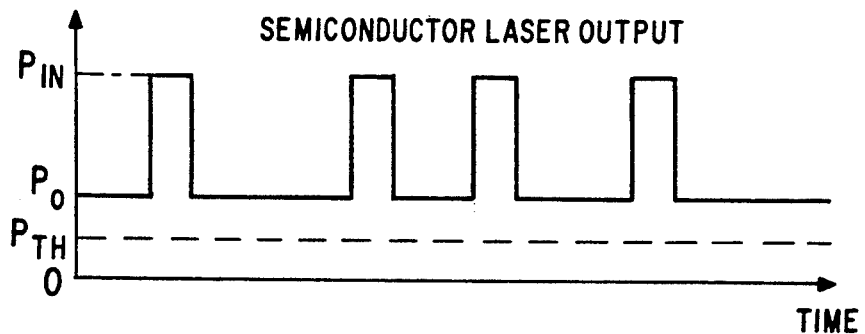

FIG. 2 shows the relationship between the output intensity PO of the pumping laser beam from the semiconductor laser 14, the output intensity Pl of the green laser beam emitted with the output intensity PO, the output intensity Pin of the sum of the pumping laser beam from the semiconductor laser 14 and the pumping laser beam from the semiconductor laser 32, the output intensity Pout of the green laser beam emitted with the output intensity Pin, the minimum exposure output intensity PL, and the required exposure output intensity PH. The graphs of FIG. 2 have a horizontal axis representing time and a vertical axis the output intensities. Usually, the modulation speed of a semiconductor-laser-pumped solid-state laser is limited by the fluorescent lifetime of the solid-state laser, and hence, the modulation speed required by a printer cannot be obtained simply by directly modulating the semiconductor laser. However, it is known that high-speed modulation can be achieved by a bias-pumping system in which a solid-state laser is bias-pumped at a level higher than a threshold valve by a semiconductor laser and a modulated pumping laser beam is added to the solid-state laser.

When the semiconductor laser 14 is continuously excited at the output intensity PO and the semiconductor laser 32 is directly modulated in the bias-modulation system, the green laser beam modulated with a quick response with respect to the modulation of the semiconductor laser 32. Since the output intensity PO of the green laser beam emitted with the pumping laser beam output intensity PO is not strong enough to make the microcapsule sheet 46 sensitive to the applied laser beam, the microcapsule sheet 46 is not printed. Only when the pumping laser beam has the output intensity Pin or higher, the green laser beam reaches the output intensity Pout which is high enough to render the microcapsule sheet 46, sensitive to the applied laser beam, so that image information represented by the applied laser beam can printed on the microcapsule sheet 46. In this manner, the microcapsule sheet is printed at high speed with the green laser beam emitted from the semiconductor-laser-pumped solid-state laser.

Figure 3:
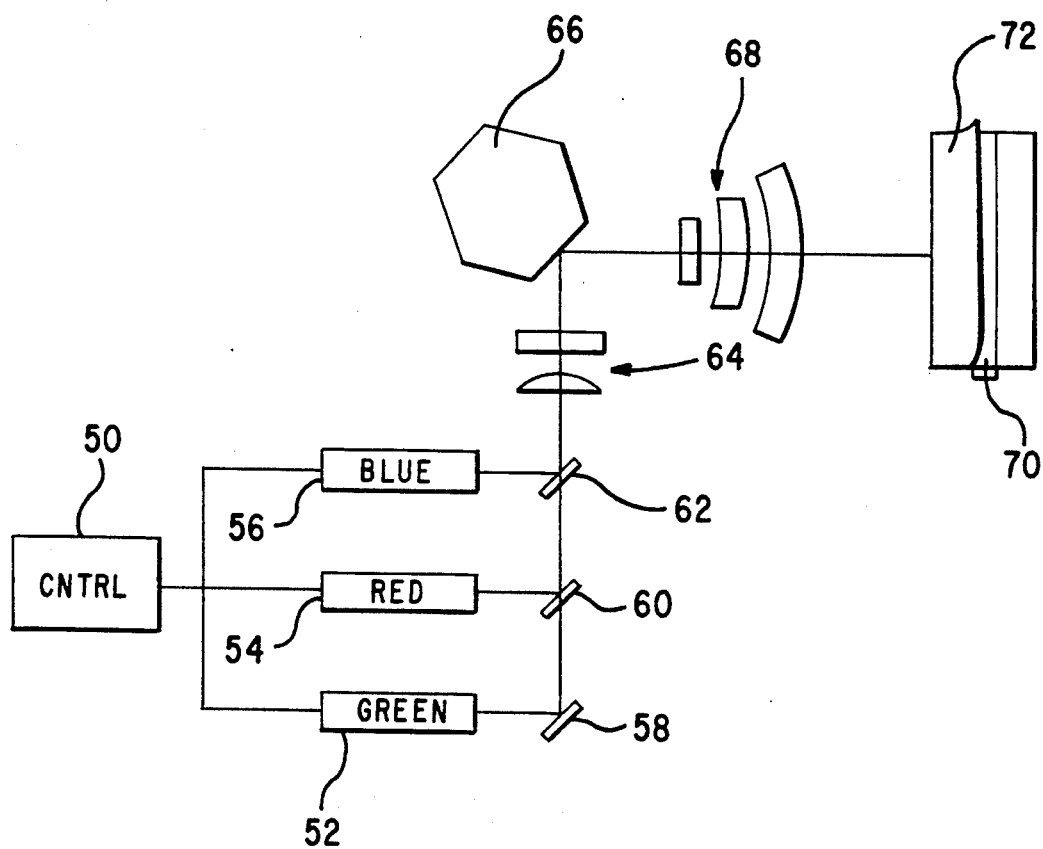
FIG. 3 is a view showing an arrangement of a color printer according to the embodiment of the present invention.

A color printer which employs a green laser beam that can be modulated at high speed, as described above, will be described below with reference to FIG. 3. The color printer has a red laser beam source 52, a green laser beam source 54, and a blue laser beam source 56. The red laser beam source 52 comprises a red semiconductor laser. The green laser beam source 54 comprises a green laser as described above with reference to FIGS. 1. and 2. The blue laser beam source 56 comprises a laser which includes an optical resonator in the form of a semiconductor-laser-pumped Nd:YAG laser and a KTP disposed in the optical resonator, the laser producing a laser beam which has a wavelength of 459 nm and a frequency that is the sum of the frequency of a fundamental wave (whose wavelength is 808 nm) emitted from the semiconductor laser and the frequency of a fundamental wave (whose wavelength is 1064 nm) emitted from the Nd:YAG laser. The laser of this type is disclosed in U.S. Pat. No. 4,791,631 issued on Dec. 13, 1988 to Baumert et al and will not be described in detail below.

The laser beam whose frequency is the sum of the frequencies of the fundamental wave from the semiconductor laser and the Nd:YAG laser is generated only after the two fundamental waves are applied to the KTP. Therefore, the blue laser beam source 56 can be modulated at high speed simply by directly modulating the fundamental wave from the semiconductor laser. The laser beam emitted from the red laser beam source 52 can easily be modulated by directly modulating the semiconductor laser electrically. The green laser beam source 54 can be modulated at high speed by the bias-pumping system, as described above.

In response to signals form a controller 50, the red, green, and blue laser beam sources 52, 54, 56, produce laser beams, respectively, which are reflected by respective dichroic mirrors 58, 60, 62 into a combined laser beam. The combined laser beam passes through an optical system 64 and is reflected by a polygon mirror 66. The polygon mirror 66 rotates at constant speed to deflect the reflected laser beam at constant cyclic period. The deflected laser beam passes through an optical system 68 and scans an microcapsule sheet 72 on a drum 70. Inasmuch as the red, green, and blue laser beams can independently be modulated at high speed depending on the signals from the controller 50, an images of desired colors can be formed on the microcapsule sheet 70 on the drum 70. The microcapsule sheet 70 is exposed to the combined three-color laser beam applied thereto, allowing the coated photosetting capsules to be selectively set. Then, the exposed microcapsule sheet is pressed to rupture those microcapsules which have not been set upon exposure, allowing encapsulated dyes to flow out and react with color developers and develop colors. Therefore, a colored image is recorded in a pattern of the ruptured microcapsules in desired colors.

The color printer according to the present invention does not employ an external modulator, but employs a semiconductor laser which is directly modulated and a semiconductor-laser-pumped solid-state laser as laser beam sources. The color printer is therefore inexpensive and compact.

In this embodiment, the blue laser beam source comprises a laser which includes an optical resonator in the form of a semiconductor-laser-pumped Nd:YAG laser and a KTP disposed in the optical resonator, the laser producing a laser beam whose frequency is the sum of the frequency of a fundamental wave emitted from the semiconductor laser and the frequency of a fundamental emitted from the Nd:YAG laser. However, there may be employed a system in which another radiation (whose wavelength is 946 nm) from the Nd:YAG laser is used as a fundamental wave and a suitable nonlinear optical element for generating a second harmonic wave is disposed in the optical resonator. In such a case, the same high-speed modulation as effected with respect to the green laser beam source is carried out.

In the modulation of the green laser beam source, the two semiconductor lasers, i.e., the semiconductor laser for bias pumping and the semiconductor laser for modulation, are employed. However, a single semiconductor laser may be employed for bias pumping and modulation.

Various other modification may be made without departing from the scope of the present invention.

In the printing device and the color printer according to the present invention, as described above in detail, no external modulator is employed, but a semiconductor laser which is directly modulated and a semiconductor-laser-pumped solid-state laser are employed as laser beam sources. The printing device and the color printer are therefore inexpensive and compact.

What is claimed is:

1. A printing device for exposing a photosensitive sheet of paper to a laser beam in response to print data to carry out printing, comprising:
   a semiconductor laser source for producing a laser beam having an intensity;
   semiconductor-laser-pumped solid-state laser including an optical resonator and a solid-state laser material disposed therein, said solid-state laser material being optically pumped by the laser beam from said semiconductor laser source and producing a laser beam to be applied to the photosensitive sheet of paper; and
   control means responsive to the print data for controlling the intensity of the laser beam from said semiconductor laser source to vary between a first intensity level and a second intensity level, wherein the photosensitive sheet of paper is insensitive to the laser beam from said solid-state laser material when the laser beam from said semiconductor laser source is at the first intensity level, and the photosensitive sheet of paper is sensitive to the laser beam from said solid-state laser material when the laser beam from said semiconductor laser source is at the second intensity level.

2. A printing device according to claim 1, wherein said semiconductor laser source comprises a first semiconductor laser source for producing a first laser beam having an intensity, a second semiconductor laser source for producing a second laser beam having an intensity, the intensity of the second laser beam varying depending upon the print data, and combining means for combining the first laser beam and the second laser beam to produce a combined laser beam, wherein the combined laser beam has an intensity ranging between the first intensity level and the second intensity level.

3. A printing device according to claim 2, wherein said optical resonator includes a nonlinear optical element for effecting wavelength conversion.

4. A printing device according to claim 3, further comprising light deflecting means disposed between said semiconductor-laser-pumped solid-state laser and the photosensitive sheet of paper for deflecting the laser beam from said semiconductor-laser-pumped solid-state laser.

5. A printing device according to claim 4, wherein said semiconductor-laser-pumped solid-state laser further includes a mirror having a surface facing said solid-state laser material.

6. A printing device according to claim 5, wherein said solid-state laser material has two opposite surfaces, one of the two opposite surfaces of said solid-state laser material and the surface of said mirror serving as said optical resonator.

7. A printing device according to claim 6, wherein said solid-state laser material is a Nd:YAG rod.

8. A printing device according to claim 3, wherein said nonlinear optical element is KTP.

9. A printing device according to claim 1, wherein the photosensitive sheet of paper carries on a surface thereof an immense number of microcapsules encapsulating a dye precursor, the microcapsules having a mechanical strength changeable depending upon the exposure of the laser beam.

10. A printing device for exposing a photosensitive sheet of paper to a laser beam in response to print data to carry out printing, comprising:
  (a) first semiconductor laser means for emitting a red laser beam;
  (b) second semiconductor laser means for emitting a green laser beam, said second semiconductor laser means comprising:
    (i) a first source comprising a first semiconductor laser source for producing a first laser beam having an intensity, a second semiconductor laser source for producing a second laser beam having an intensity, the intensity of the second laser beam varying depending upon the print data, and first combining means for combining the first laser beam and the second laser beam to produce a first combined laser beam having an intensity;
    (ii) a first semiconductor-laser-pumped solid-state laser including a first optical resonator and a first solid-state laser material disposed therein, said first solid-state laser material being optically pumped by the first combined laser beam and producing a laser beam to be applied to the photosensitive sheet of paper; and
    (iii) first control means responsive to the print data for controlling the intensity of the first combined laser beam to vary between a first intensity level and a second intensity level, wherein the photosensitive sheet of paper is insensitive to the laser beam from said first solid-state laser material when the first combined laser beam is at the first intensity level, and the photosensitive sheet of paper is sensitive to the laser beam from said first solid-state laser material when the first combined laser beam is at the second intensity level; and
  (c) third semiconductor laser means for emitting a blue laser beam, said third semiconductor laser means comprising:
    (i) a second source comprising a third semiconductor laser source for producing a third laser beam having an intensity, a fourth semiconductor laser source for producing a fourth laser beam having an intensity, the intensity of the fourth laser beam varying depending upon the print data, and second combining means for combining the third laser beam and the fourth laser beam to produce a second combined laser beam having an intensity;
    (ii) a second semiconductor-laser-pumped solid-state laser including a second optical resonator and a second solid-state laser material disposed therein, said second solid-state laser material being optically pumped by the second combined laser beam and producing a laser beam to be applied to the photosensitive sheet of paper; and
    (iii) second control means responsive to the print data for controlling the intensity of the second combined laser beam to vary between a third intensity level and a fourth intensity level, wherein the photosensitive sheet of paper is insensitive to the laser beam from said second solid-state laser material when the second combined laser beam is at the third intensity level, and the photosensitive sheet of paper is sensitive to the laser beam from said second solid-state laser material when the second combined laser beam is at the fourth intensity level.

11. A printing device according to claim 10, wherein each of said first and second optical resonators includes a nonlinear optical element for effecting wavelength conversion.

12. A printing device according to claim 11, wherein the photosensitive sheet of paper carries on a surface thereof an immense number of microcapsules each encapsulating selective one of three primary color dye precursors and having differing photosensitivities depending on the red, green and blue laser beam applied thereonto.

13. A printing device for exposing a photosensitive sheet of paper to a laser beam in response to printing data to carry out printing, comprising:
  (a) first semiconductor laser means for emitting a red laser beam;
  (b) second semiconductor laser means for emitting a green laser beam, said second semiconductor laser means comprising:
    (i) a semiconductor laser source for producing a laser beam having an intensity;
    (ii) a first semiconductor-laser-pumped solid-state laser including an optical resonator and a solid-state laser material disposed therein, said solid-state laser material being optically pumped by the laser beam from said semiconductor laser source and producing a laser beam to be applied to the photosensitive sheet of paper; and
    (iii) control means responsive to the print data for controlling the intensity of the laser beam from said semiconductor laser source to vary between a first intensity level and a second intensity level, wherein the photosensitive sheet of paper is insensitive to the laser beam from said solid-state laser material when the laser beam from said semiconductor laser source is at the first intensity level, and the photosensitive sheet of paper is sensitive to the laser beam from said solid-state laser material when the laser beam from said semiconductor laser source is at the second intensity level; and
  (c) third semiconductor laser means having a second semiconductor-laser-pumped solid-state laser for producing a laser beam of a first frequency and a nonlinear optical element for producing a laser beam of a second frequency, for emitting a blue laser beam whose frequency is a sum of the frequencies of the laser beams emitted by said second semiconductor-laser-pumped solid-state laser and said nonlinear optical element.

14. A printing device according to claim 13, wherein said optical resonator of said first semiconductor-laserpumped solid-state laser includes a nonlinear optical element for effecting wavelength conversion.

15. A printing device according to claim 14, wherein the photosensitive sheet of paper carries on a surface thereof an immense number of microcapsules each encapsulating selective one of three primary color dye precursors and having differing photosensitivities depending on the red, green and blue laser beam applied thereonto.

* * * * *